United States Patent
Breuer et al.

(10) Patent No.: US 12,549,245 B2
(45) Date of Patent: Feb. 10, 2026

(54) METHOD TO MANAGE A TRANSPORT OF DATA OVER A RADIO NETWORK

(71) Applicant: Telit Cinterion Deutschland GmbH, Munich (DE)

(72) Inventors: Volker Breuer, Boetzow (DE); Frank Gunther, Berlin (DE)

(73) Assignee: Telit Cinterion Deutschland GmbH, Munich (DE)

( * ) Notice: Subject to any disclaimer, the term of this patent is extended or adjusted under 35 U.S.C. 154(b) by 89 days.

(21) Appl. No.: 18/567,776

(22) PCT Filed: Jun. 17, 2022

(86) PCT No.: PCT/EP2022/066605
§ 371 (c)(1),
(2) Date: Dec. 7, 2023

(87) PCT Pub. No.: WO2023/274755
PCT Pub. Date: Jan. 5, 2023

(65) Prior Publication Data
US 2024/0146398 A1 May 2, 2024

(30) Foreign Application Priority Data
Jul. 1, 2021 (EP) .................................. 21183042

(51) Int. Cl.
*H04B 7/185* (2006.01)
*H04L 9/40* (2022.01)

(52) U.S. Cl.
CPC ........... *H04B 7/1851* (2013.01); *H04L 63/06* (2013.01); *H04L 63/18* (2013.01)

(58) Field of Classification Search
CPC ........ H04B 7/1851; H04L 63/06; H04L 63/18
See application file for complete search history.

(56) References Cited

U.S. PATENT DOCUMENTS

2003/0055905 A1* 3/2003 Nishiyama .............. H04L 51/08
709/206
2008/0256245 A1 10/2008 Parmar et al.
(Continued)

FOREIGN PATENT DOCUMENTS

| CA | 2312592 | C | * | 10/2005 | .......... H04M 3/2254 |
| CA | 3008896 | C | * | 11/2021 | ............ G06F 9/4411 |
| CN | 106452749 | | | 6/2019 | |

OTHER PUBLICATIONS

International Search Report of PCT Application No. PCT/EP2022/066605, mailed Sep. 20, 2023.

*Primary Examiner* — Jean B Corrielus
(74) *Attorney, Agent, or Firm* — PEARL COHEN ZEDEK LATZER BARATZ LLP

(57) ABSTRACT

The present invention relates to a method to manage a transport of data over a radio network, said radio network comprising terrestrial base nodes and satellites, both adapted to communicate with communication devices, said method comprising the following steps, for a communication device communicating with terrestrial base nodes: detecting an unsecure earth based connection with the terrestrial base nodes; selecting sensitive data in the data to be transported, said data being called security data; opening a connection with a satellite; transmitting the security data using the satellite's secondly opened connection; transmitting the remaining of the data to be transported using the terrestrial base node to a recipient communication device, transmitting, using the terrestrial base node or the secondly opened connection, additional data subset to the recipient communication device, said additional data subset enabling a recipient communication device communication device of the transmitted data to know how to manage the data as received on the two connections.

14 Claims, 1 Drawing Sheet

(56) References Cited

U.S. PATENT DOCUMENTS

2008/0256246 A1* 10/2008 Schlacht ................. H04L 63/18
                                                        709/228
2019/0036717 A1*  1/2019 Kebler .................. H04L 45/484

* cited by examiner

METHOD TO MANAGE A TRANSPORT OF DATA OVER A RADIO NETWORK

CROSS-REFERENCE TO RELATED APPLICATIONS

This application is a National Phase Application of PCT International Application No. PCT/EP2022/066605, International Filing Date Jun. 17, 2022, claiming the benefit of European Patent Application No. 21183042.7, filed Jul. 1, 2021, which are hereby incorporated by reference in their entirety.

FIELD OF THE INVENTION

The present invention relates to a method to manage a transport of data over a radio network. In particular it concerns transport of data over radio network comprising terrestrial base nodes and satellites, both adapted to communicate with communication devices. The invention also relates to a communication device using said method, to an application to be installed in a communication device, to a service center implementing some steps of the invention.

BACKGROUND OF THE INVENTION

Non Terrestrial Networks (NTN) are part of the elements standardized within 3GPP. However, NTN is simply a new element and none interaction concerning data transport with the existing is so far documented.

It is in particular here noted that the classical carrier aggregation approach will anyhow not work with NTN as satellite and earth based connection are too different in payload and latency. Thus it would require new schemes to be standardized whilst application dependent methods can rely on so far existing standard.

Satellite are known to be secure and resistant against manipulation, also from within the network. Such network have however limitations like the limited traffic capacity. Earth base network have high throughput at low cost. However security and reliability are weak in certain areas related to equipment and also operator's reliability.

Currently data may be separated and sent via different networks, however such networks all have in common that they are earth based. They thus undergo the same threads. As an example, base stations, also of different technologies, are co-located. Hence only one cabinet may need to be compromised to have full access to the information at the base station, which may include exchange of sensitive data, like security/key related information.

More precisely, it exists a LTE non-3GPP (WLAN) inter-working where LTE is doing the control part and WLAN provides the but-pipe. This solution is only for transport purposes and does not change in any case the obtained security level.

There is a need to increase the security in such situation where the data transport relies on multiple networks.

Today's network tight-interworking between New Radio (NR) and LTE or NR-NR, i.e where two technologies are used in parallel for transport with the extreme but likely case one network operates the control plane and the second network is responsible for the user-plane, i.e. the user transport.

In such cases, it could occur that the secondary network is disturbed for whatever reason and hence the transport would be interrupted. A simple renewal of the setup would lead again to same situation, i.e. the master technology would run the control plane and, for user plane traffic, activate the 2nd RAT/2nd NodeB.

Such situation could occur also in a network when for example the Packet Data Network (PDN) gateway would be down or disturbed whilst the Access and Mobility management Function/Mobility Management Entity (AMF/MME) responsible for control plane would work as normal. This could happen accidentally or on purpose.

The invention also addresses this situation where the user needs to circumvent such traffic outage.

Thus due to content to the edge and provision of control information at the eNB/gNB, the risk of compromising data becomes higher. Especially when in attacks or data compromise, network vendors could be included.

There is thus a need to improve multi-network inter-working for security and reliability reasons.

Further alternative and advantageous solutions would, accordingly, be desirable in the art.

SUMMARY OF THE INVENTION

The present invention aims at proposing a more secure and reliable inter-working involving multiple networks.

The present invention is defined, in its broadest sense, as a method to manage a transport of data over a radio network, said radio network comprising terrestrial base nodes and satellites, both adapted to communicate with communication devices, said method comprising the following steps, for a communication device communicating with terrestrial base nodes:
  evaluating an earth based connection with the terrestrial base nodes having lower security than required for the data to be send;
  selecting sensitive data in the data to be transported, said data being called security data;
  opening a connection with a satellite;
  transmitting the security data using the satellite's secondly opened connection,
  transmitting the remaining of the data to be transported using the terrestrial base node to a recipient communication device,
  transmitting, using the terrestrial base node or the secondly opened connection, additional data subset to the recipient communication device, said additional data subset enabling the recipient communication device receiving the transmitted data to know how to manage the data as received on the two connections.

The invention exploits the capabilities of earth based and satellite transport in a combined manner and proposes a specific combined operation or inter-working in connected mode using terrestrial and non-terrestrial networks. It takes the best of the two as each of the components satellite and earth based have their advantages. The combined transport according to the invention enables to benefit from the high throughput at low cost of the terrestrial network and from the security provided by the non-terrestrial network. The criteria to open a second connection is security which also determines data/information separation. The security level/need of the data to be transmitted is compared against the security rating of the earth based network In case the security rating is not sufficient, the second connection is opened according to the invention via satellite and the data are separated in the described manner.

The invention also enables to deal with the limited traffic capability of the satellite network. As offloading such satellite network is advantageous, the invention enables to implement useful interaction with earth-based networks.

Hence a satellite operator can use the invention for offloading purposes to send parts of the data via earth based whilst relevant security parts are send via satellite instead of sending all data via satellite. For this purpose an application of the invention rates security level/needs of the data to be transported in order to select security data within the data to be transported.

So it is original according to the invention to separate information into relevant parts which can be decoded and used as information on their own, said information being transferred secure via satellite and main information stream being transferred via earth-based network to use its cheap transport. The invention also make the recipient aware that further information should have arrived or is about to arrive.

To influence the behavior related to opening a second connection and separating information content to NTN and earth-based network upon detection that earth based network is classified as unsecure is specific to the invention.

With the invention, the security is the criteria to open a satellite connection. Opening a second connection is known as such. However, the second connection is always opened for transport means enhancements. Hence second transport is always bigger transport. Here second transport is opened for security reasons, i.e. considering the first transport to be insecure or area to be insecure and add additional low throughput high security transport to increase data security for main transport network. This avoids and protects from attacks from within the network which is new in the art.

The invention comprises evaluating the security level of the earth-based connection based on certain aspects such as operator used equipment in the area the device is located in. In the simplest manner this can be a simple comparison of the MNC and MCCC of the current earth based network being compared with a list containing security ranking for all networks, i.e. identifying those being unsecure.

The data which are supposed to be transmitted are advantageously evaluated and rated according to their security needs, i.e. whether it is just local information or more security relevant status information. The security rating of the earth based network and the data to be transmitted is compared and for those data where earth based security is rated to be insufficient, further means as described by the invention, i.e. opening a second connection via satellite and transferring there the sensitive data, are taken.

The invention comprises a step of detecting unsecure earth based connection before deciding to open a satellite connection and to send data via said connection. Then making use of attributes of the two kinds of networks and introducing information separation for transmission is important aspect of the invention. The nature/pre-requisites of the used networks being here very different, a higher security is achieved. The invention is particularly interesting in military or goods tracking context where sensitive data are transported.

The invention takes advantage of the fact that satellite based communication and earth-based communication are sufficiently different in nature so that a separation of the information to each of the networks, respecting its specialties, may bear new high potential solutions for increasing reliability and security of mobile exchanged information.

This is a new method for high security information exchange involving satellite network as the most secure network available in many parts of the world. In particular, satellites are controlled by operators not being located in the unsecure area or not having such technology in place. The invention also enlarges the use of communication satellites. The invention applies to LTE and to new radio.

The invention also concerns situations where traffic is interrupted. In such cases, the communication device may use and include inband control plane signaling on the satellite connection to exchange a minimum set of data to the receiving endpoint, including disturbance notice.

According to an advantageous feature, the additional data subset comprises information enabling the recipient communication device to know which data sets as received on the two connections to combine.

Such a feature enables to transfer important data on how to combine the received data to the recipient communication device.

According to another advantageous feature, the step of selecting data selects security data required to access the transported data at a recipient communication device.

Such a feature selects essential data to access and understand the transported received data. This is particularly valuable to transport on the satellite connection only those data that are essential to access other data that are transferred via the terrestrial network.

Thus is particular, the security data advantageously includes data required to decrypt the transported data.

Thus, advantageously, the security data includes cryptographic keys to be exchanged between the communication device and the recipient communication device. It is very advantageous to secure high volume of data. A large amount of data can indeed be sent encrypted while security data containing the cryptographic keys to decrypt the large amount of data are sent via satellite. It also enables to do payload offloading of satellite connection.

Also, advantageously, the security data includes an indication on the amount of data transported via the unsecure earth based connection.

According to an implementation of the invention, the detection of unsecure earth based connection depends on at least one of the following: geographical area, Mobile Network Operator, Mobile Country Code, Mobile Network Code, network equipment in use, detected earth based connection classified by a stored list to be unsecure.

Such implementation enables to detect an unsecure situation for data transport and to react according to the invention by opening a satellite connection to transfer a sensitive part of the data to be transported. This functionality of the invention to be able to identify insecure areas for critical communication by geography, MNO, network equipment or any other identified thread for network security and attacks which may come from within the network is particularly interesting, where most known security aspects and functionalities of the known mobile standards do not help. Detecting unsecure connection in earth-based connection and when it is detected that communication depends on an insecure connection, securing the communication by opening a second security reliable connection with a satellite, which is less efficient and too expensive for the entire transport.

In that sense, also the separation of secure information into sensitive data required to decode and decrypt the remaining payload may offer scenarios for satellite traffic offloading. For example, in case it is too expensive to send all important data via satellite the data can be separated in un-decryptable and un-decodable payload to be offloaded from satellite network to earth based network and the sensitive data being send via satellite. The security remains the criteria to select security data.

Advantageously, the step of evaluating an insufficient security for an earth-based connection with the terrestrial base nodes at least for a part of data to be transported comprises:
- a sub-step of evaluation of a security need for the data to be transported;
- a sub-step of evaluation of a security level of the earth based connection;
- a sub-step of comparison of said security need with said security level.

Such sub-steps enable to evaluate an insufficient security of the earth-based connection for a specific part of the data.

The evaluation of the security need of data to be transported can be done in simple or more advanced classifications. In a simple form all sensor like data i.e. data reflecting information related to the environment, weather data and such information which also can be retrieved from other systems are to be seen as non-critical data. The same is true for data send in a redundant manner, i.e. status information containing the last 24 hours transmitted hourly, means most of the data is redundant, and if once per day reception confirmation is received this is deemed sufficient. Position information especially when being transferred from a tracking and trace device will already have a higher security need, or data related to a route change which may be caused by weather data, as such information needs to be available at the service center in a case of an incident to search and rescue at the right place.

A software update is also rather low security data. This is especially true for just downloading or providing the Sw download packets. It can be for example receiving the related data in downlink and storing said parts in a device. But related execution control, i.e. when to perform the update, if controlled by the security center and related key exchanges or security updates are rather considered as highest priority data. Also in case of goods tracking whether a container was opened or not is an information which needs to be immediately transferred with highest priority to the service center in a secure manner. It could be a legal activity, i.e. a border control or it could be a thief attack, which is up to the service center to decide or by the local application highlighting the attack immediately, if e.g. a container is to be opened only in a special premises and the position does not match.

In other use cases, i.e. military, the entire communication may be judged critical and hence summary and sensitive data transported via satellite as such or only remaining payload being non-self decodable or decryptable to be transported via the earth-based networks. As indicated above, there are general classifications possible such as non-critical for sensor, software download packets or redundant data, critical data such as route changes or position information or all data judged critical in case of military communication in case of being stationed in a different country than the home-country or an equivalent partner country.

Even in home country, parts of said data can be judged critical depending on the application and its use case. Networks or earth-based connection in general could be considered trusted, i.e. if from MCC (Mobile Country Code) it is concluded that it is a partner country or a reliable country the security rating will be accordingly high and data fitting to said security level or being of lower security are transferred via said earth-based network. This applies for example for redundant data. In case of said redundant data also the network rating can depend on past experience. If redundant data containing some data of the last 24 hours and hourly transmitted were confirmed each time by the application server as being received, said data can further be transmitted via said network. In case that for subsequent transmissions, no reception confirmation would have been received, the network would be regarded as unreliable and also such data could be transferred via other connections, at least once within the redundancy time window (24 hours in this example).

Two security ratings are thus established, on one side, for each of the data to be transported and, on the other side, for the available earth-based networks depending on their characteristics. The security rating of the currently used network is necessary monitored but other available earth-based networks can also be rated when available, even if not currently used. For example several RAT can be available for the communication device and a own security rating can be established for each of them.

Accordingly tables are advantageously monitored for the data to be transported and for the earth-based networks available to be used by the communication device or used by the communication device. The data table enables a priority queue to be monitored according to the rating as listed in the table. Data are advantageously chosen in the table as being security data according to their security ratings. As soon as at least a part of data to be transported have a need of security above the security level of a currently used earth-based network, the user equipment triggers the opening of a connection with a satellite network. The highest rated data can be selected as security data. Security data can also be specific data necessary for the data to be transported to be protected, a cryptographic key for example. It can also be the additional data subset that is selected as security data.

All data types or possibilities for network rating are examples and shall be considered a set of examples pointing to the flexibility of the claimed method being able to be optimized for various use cases and scenarios by the end-customer/user.

According to a further feature of the invention, said method comprising the steps, for the recipient communication device of the data,
- receiving data via different connections including at least one connection being classified as unsecure earth based connection and at least one satellite opened connection, said data including security data received using the satellite opened connection,
- combining security data with remaining of the data to be transported as received via the unsecure earth based connection using the additional data subset,
- detecting missing data if ever.

This feature of the reception of the data on the recipient communication device's side enables the transported data to be received and processed with integrity at the recipient.

According to a further feature, said method comprises the steps of, for the recipient communication device of the data, while detecting missing data, sending a request to the communication device to send again the remaining data to be transported on the satellite connection.

This feature enables to switch the whole transport of the data to be transported on the satellite link. It enables to insure the reception of the data whatever occurs on the terrestrial network. Indeed the satellite link can be considered as globally available also with sufficient volume but at high cost, hence can be activated always as complement based on application indication in general.

When the recipient only receives the security data and the data via the unsecure network get lost in general, it can thus request a transmission of the other data via the satellite link.

This distinction or switching on combined usage may especially also be interesting for special military circumstances and their related equipment.

In a specific implementation, the recipient communication device is a service centre or an end-user equipment.

Such an implementation corresponds to the case where a service centre receives the data before transmitting them to, typically, an end-user equipment. It is then the entity that process and combine the received data.

According to a further feature of the invention, the step of detecting an unsecure earth based connection with the terrestrial base nodes includes a step, for the communication device, of reception of a message from the recipient communication device, indicating to open satellite connection for reception of security data.

This feature enables any recipient communication device, which can for example be a service center, to inform a communication device of the necessity to open a satellite connection to transfer data to be transported. More in general any recipient communication device is thus able to contact the device via unsecure data path to request and indicate activation of secure channel. Such possibility is advantageous when e.g. trust relation has changed for the area the device is located in, or in general the server wants to send himself security data and the device has not always its satellite connection active. Especially as maintaining two connections earth based and satellite always in a ready to reception mode may consume high power and hence for power saving reasons it is sensible to switch off one of the systems, preferably the satellite system being most power expensive. Upon indication via the unsecure connection said satellite connection is re-opened or set-up and hence the device is reachable via said link, but can also, once the connection is setup, contact the requesting server, indicating that connection is available.

According to an advantageous feature, said method comprises a step of prioritizing data within the communication device for their selection as sensitive data, the selection step being such that priority is taken into account to select sensitive data to be security data to be sent on the opened satellite connection.

The device thus has priority queues that lists the required reliability for the data. For example the priority/reliability infinity corresponds to the satellite connection and data that are so prioritized are necessarily transferred using the satellite connection. If momentary said queue is empty also information from highest remaining queue may be taken as security data. Such security data is then provisioned in a self-decodable and meaningful manner. Contrarily, via the earth based unreliable transmission, information is transferred which cannot be decrypted or decoded or which cannot result in a meaningful piece of information without the information content transferred via satellite. The priority/reliability queues in the device are mapped to the different networks available, with an infinite priority/reliability value attributed to the satellite network.

As an example the information related to the local weather condition which is also available via many other means has no or only small security relevance. Hence such information can be sent via the insecure network with the normal build-in network security functions not protecting against certain from within attacks. However, if for e.g. a tracking and trace route or a military operation, said weather condition may result in a change of the taken route, i.e. a new route to be followed either concluded by the device or by the service center. Hence in such a situation the weather information as such may be higher rated in security or only the route change is the secure information which is only transferred via a secure satellite path.

According to a specific feature, both connections use different destination IP addresses.

With this feature, only the sender is aware that both streams belong together.

Advantageously, the recipient communication device is made aware of the sending of data on two IP addresses by related information received via the satellite connection.

The related information is preferably provisioned using the secure stream. It enables to know that other data are missing or that the two streams belong together.

The invention also concerns a communication device adapted to communicate with terrestrial base nodes and satellites of a radio network and to open connection with terrestrial base nodes or with satellites, said communication device being further adapted to manage a transport of data over a radio network according to the method of any one of the preceding claims, said communication device comprising:
  an unsecure earth based connection detector to evaluate an insufficient security for an earth based connection with the terrestrial base nodes at least for a part of data to be transported;
  a selector for selecting data in the data to be transported, said data being called security data;
  the transmission of data being then managed by the communication device to transmit the security data using a satellite's secondly opened connection, to transmit the remaining of the data to be transported using the terrestrial base node to a recipient communication device and to transmit, using the terrestrial base node or the secondly opened connection, additional data subset enabling a recipient communication device of the data to know how to manage the data as received on the two connections.

It also relates to an application adapted to be installed in a communication device, said application comprising instructions to implement the steps of the method of the invention to manage the transport of data over a radio network.

Such a security application makes use of multiple network links for sensitive data in areas or networks being classified as unsecure and transfers a non-negligible part of the data with special security information or related information via a separate trusted satellite network. As seen above, unsecure area or network may be related to the geographical area, MNO or network equipment in use in a certain region. The method of the invention and the related application thus provides additional security for the customer or applicant of our module where and when needed.

The invention is an add-on in security easy to realize and beneficial for the customer. It is a service application, adding more security compliant with encryption. Encryption is indeed one of the other solution to protect data. The invention offers a very interesting possibility, which is to exchange the encryption related information using the secure satellite connection. With encryption, it is noted that information getting lost as such cannot be detected or circumvented unless by a timer based secondary mechanism while this is possible with the invention by considering the data subset and the effective received data. In-band signaling relative to the re-combination of data via main earth-based network according to the invention can be further harmonized in a standard. Data subset according to the invention is particularly concerned.

Also for satellite operators, the invention relates to an interesting method for offloading data from their network. For a customer having agreed on a contract with secure transport providing high-payload the application of the invention separate the data transferred in an unsecure area into sensitive data and offloaded payload which can not be decrypted without the data transferred via satellite. Both are sent to a service center in a secure area and, according to the construction information contained in the sensitive data, the entire payload is reconstructed.

It relates at last to a recipient communication device configured to combine data received via different network connections, a first connection being classified as unsecure earth based connection, and security data using a second satellite connection. Such a device is advantageously a service center.

While such a recipient communication device detects that it only received the security data transmitted by the device via the satellite connection, it is adapted to request the communication device to send the unreceived data part also via satellite. This enables to solve the problem of data lost via unsecure earth based connection.

Advantageously such a recipient communication device, here typically a service center, is adapted to send a message via earth-based connection to a communication device indicating to start communication via unsecure earth based connection and activating satellite connection for reception of security data.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
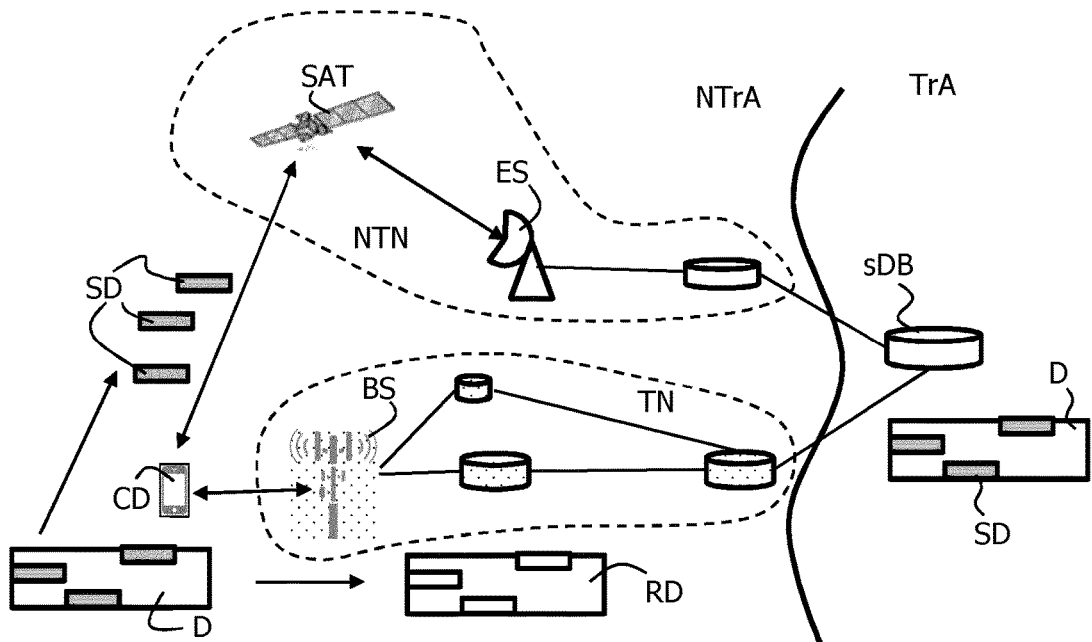
FIG. 1 schematically shows the context of the invention and the environment in which the invention is advantageously implemented.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the scope of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows the context of the invention where a communication device CD stores data D, including sensitive data SD in grey, that must all be transported in a non-trusted area NTrA. In the shown example, the data D, including sensitive data SD, in grey are also stored in a secured database sDB in a trusted area TrA. This database sDB is accessible by two kinds of network according to the invention, one terrestrial TN represented with dotted surfaces and one non-terrestrial NTN including at least a satellite SAT and an earth station ES. The terrestrial network TN comprises a base station BS in communication with the communication device CD. The terrestrial network TN is unsecure. The satellite network as being deployed in the orbit is always considered as secure regardless whether the device itself is located in an unsecure area.

According to the invention, in the shown example, all sensitive data SD are selected as security data of the invention by the communication device CD. The reference SD thus designates the sensitive data and the security data indifferently.

The invention proposes an earth based-NTN close interworking for security reason. In said interworking each network NTN and TN is considered with its certain capabilities and circumstances. Thus in non-critical situation or idle mode the device CD camps on the earth based network TN. Then, when communication is setup i.e. due to incoming or outgoing calls of a certain priority or categorized by the communication device CD in a certain way, additional security settings and configurations are activated according to the invention.

In such situation the device does not trust a single first network as this may be compromised and hence may only provide parts of the data via said first network being the major transport network, whilst other information parts required to fully understand/decrypt the message at a recipient are transferred via a satellite network.

As an example the earth based network TN performs the main data transport and key exchange and parameters are exchanged by the device setting up a NTN-connection to the calling party.

Only the end device knows that these calls are related and makes use of both streams in the considered way, i.e. for decrypting or completion of the data streams.

The advantage is that, during idle, low power consumption is achieved, as a satellite link is more difficult to maintain in idle mode i.e. having subsequent cell change in Low Earth Orbit (LEO) scenarios, i.e. no Geostationary Earth Orbit (GEO).

The satellite itself, as a relay to an earth station ES, which is classically protected in a shielded/secured environment, has high reliability and may provide additional on top security on an otherwise isolated/separated non-terrestrial network.

Said security aspects also align with the low/expensive transport capabilities. It is recognized that the earth-based link may be easy to be accessed by man in the middle or other attacks even attacking a whole serving point/mast base station cabinet.

The invention is also useful in certain mobile use cases where the communication device roams into networks where the trust level is lower and where there is a certain probability that earth-based networks are compromised. Even taking into account the security thread, the transport capabilities are very high. Hence earth-based networks can be used for well-encrypted and end-to-end secured data. However for an attack against the data-stream from within said network there is a certain risk on compromising or at least manipulating the stream. Moreover, in the simplest form of attack, the data may just get lost when being transferred via the unsecure TN.

Then in most cases no or a corrupted communication would already be easy achieved. To circumvent this and ensure minimum information exchange, the second communication pipe of the invention is needed which is either a complete separate system or which could also be inband information exchange via control plane in parallel.

In terms of implementation, it can be similar to Evolved Packet System (EPS) control Internet of Thing optimisation where a data packet is contained within the Non-access stratum (NAS) message and hence is routed from MME or AMF via other gateways than the packet stream via first PDN-gateway.

Main use case is secured transport of information where part of the information itself is transferred via another network so also an attack from within the network cannot be used to compromise/misuse the transferred information. Also entire loss of data via said unsecure network would be easily detected by a recipient, as the data transferred via the secure NTN would point to that fraction of the payload being transferred via the unsecure TN.

The communication device CD advantageously has an application which opens in an area or network defined as unsecure a multi-link via separate networks, where one network is a so called high protected network via satellite where attacks from within the network can be neglected and the other network is the high transport network.

The sharing and distribution of the information is done in such a way, that the recipient or any other listening party can only retrieve the data content when having the information from the high security transport network in addition.

Earth based and satellite based calls have different tracks and hardware entities. They also use different locations so communication cannot be compromised by just compromising one network or one base station. As seen on FIG. 1, in the untrusted area, information is separated and key parts are transferred via satellite stream, in the trusted area. Then information is recombined at the recipient.

Figure 2:
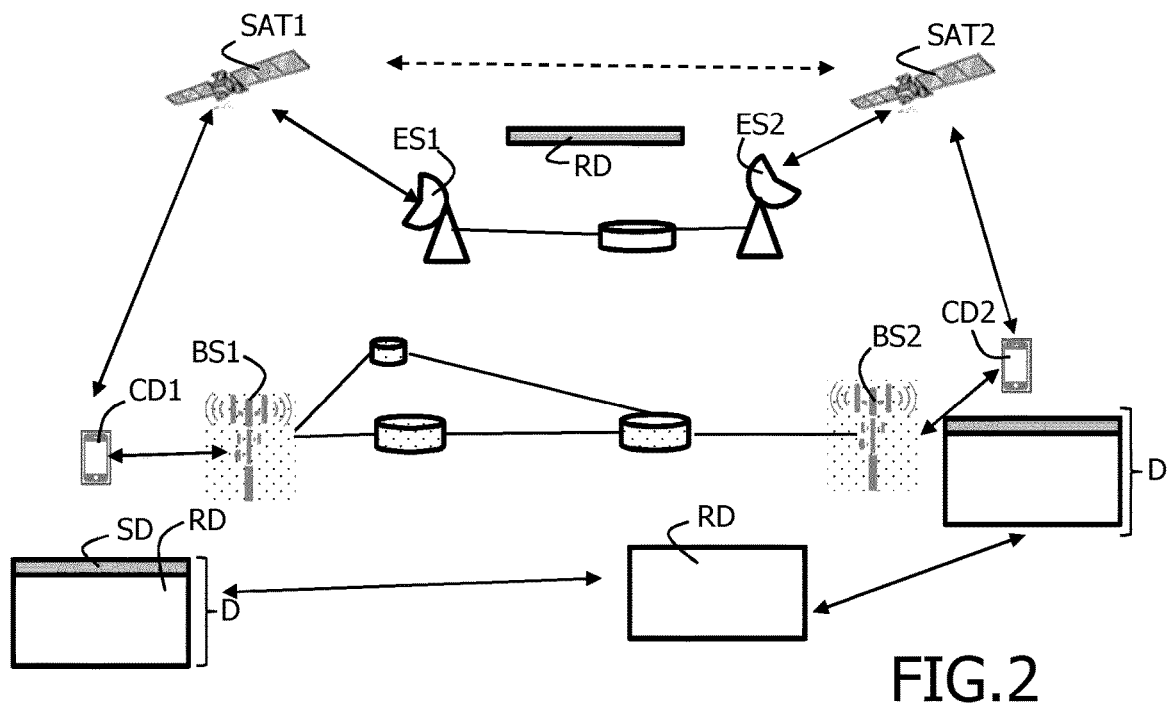
FIG. 2 schematically illustrates the transfer of the data according to the invention.

FIG. 2 illustrates a transfer of data D including security data SD between two communication devices CD1 and CD2 in an untrusted area.

Security data SD are transferred using the satellite connection between a first satellite SAT1 connected to the first communication device CD1 and a second satellite SAT2 connected to the second communication device CD2. Remaining data RD are transferred using the terrestrial network via a first base station BS1 connected to communication device CD1 and a second base station BS2 connected to communication device CD2. The combination of the information is only done at the recipient CD2, as all networks in between except satellite are considered as non-trusted. Fragmentation according to network transport capabilities, but without the security data SD part remains not usable.

The invention implements a data subset, which on its own is useful information for the recipient besides information required to retrieve the entire content of the received message. Such data subset is advantageously securely transported via the high security transport network. Also the data streams are referencing each other in-band, so that the recipient knows which data sets to combine.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted.

The invention claimed is:

1. A method to manage a transport of data over a radio network, said radio network comprising terrestrial base nodes and satellites, both adapted to communicate with communication devices, said method comprising the following steps, for a communication device communicating with the terrestrial base nodes:
   evaluating an insufficient security for an earth based connection with the terrestrial base nodes at least for a part of data to be transported;
   selecting sensitive data in the data to be transported, said sensitive data being called security data;
   opening a connection with a satellite;
   transmitting the security data using the satellite connection;
   transmitting remaining data of the data to be transported using the terrestrial base nodes to a recipient communication device;
   transmitting, using the terrestrial base nodes or the satellite connection, additional data subset to the recipient communication device, said additional data subset enabling the recipient communication device receiving the security data and the remaining data to know how to manage the data as received on the earth based connection and the satellite connection;
   wherein detection of an unsecure earth based connection depends on at least one of the following: geographical area, Mobile Network Operator, Mobile Country Code, Mobile Network Code, network equipment in use, earth based connection being classified by a stored list as unsecure.

2. The method according to claim 1, wherein the additional data subset comprises information enabling the recipient communication device to know which data sets as received on the two connections to combine.

3. The method according to claim 1, wherein the step of selecting sensitive data selects security data required to access the remaining of the transported data at the recipient communication device.

4. The method according to claim 3, wherein the security data includes data required to decrypt the remaining of the transported data.

5. The method according to claim 1, wherein the security data includes an indication on the amount of the remaining data transported via the unsecure earth based connection.

6. The method according to claim 1, wherein evaluating an insufficient security for an earth based connection with the terrestrial base nodes at least for a part of data to be transported comprises:
   a sub-step of evaluation of a security need for the data to be transported;
   a sub-step of evaluation of a security level of the earth based connection;
   a sub-step of comparison of said security need with said security level.

7. The method according to claim 1, said method comprising the steps, for the recipient communication device of the data to be transported:
   receiving the data to be transported via different connections the unsecure earth based connection and the satellite connection, said data including the security data received using the satellite connection;

combining the security data with the remaining as received via the unsecure earth based connection;
detecting missing data if ever.

8. The method according to claim 7, said method comprising the steps of, for the recipient communication device of the data to be transported, while detecting the missing data, sending a request to the communication device to send again the remaining data to be transported on the satellite connection.

9. The method according to claim 1, wherein the recipient communication device is a service center or an end user equipment.

10. The method according to claim 1, wherein the step of evaluating the insufficient security for the earth based connection with the terrestrial base nodes includes a step, for the communication device, of reception of a message from the recipient communication device, indicating to open the satellite connection for transport of security data.

11. The method according to claim 1, said method comprising a step of prioritizing data within the communication device for their selection as sensitive data, the selection step being such that priority is taken into account to select sensitive data to be security data to be sent on the opened satellite connection.

12. The method according to claim 1, wherein both connections use different destination IP addresses.

13. The method according to claim 12, wherein the recipient communication device is made aware of the sending of data on two IP addresses by related information received via the satellite connection.

14. A communication device adapted to communicate with terrestrial base nodes and satellites of a radio network and to open connection with the terrestrial base nodes or with the satellites, said communication device being further adapted to manage a transport of data over the radio network, said communication device comprising:
an unsecure earth based connection detector to evaluate an insufficient security for an earth based connection with the terrestrial base nodes at least for a part of data to be transported;
a selector for selecting sensitive data in the data to be transported, said sensitive data being called security data;
wherein the communication device is configured to:
transmit the security data using a satellite connection,
transmit remaining data of the data to be transported using the terrestrial base nodes to a recipient communication device, and
transmit, using the terrestrial base nodes or the satellite connection, additional data subset enabling the recipient communication device of the data to know how to manage the security data and the remaining data as received on the earth based connection and the satellite connection;
wherein detection of an unsecure earth based connection depends on at least one of the following: geographical area, Mobile Network Operator, Mobile Country Code, Mobile Network Code, network equipment in use, earth based connection being classified by a stored list as unsecure.

* * * * *